United States Patent [19]

Ishida

[11] 4,284,162
[45] Aug. 18, 1981

[54] EXHAUST SYSTEM OF AUTOMOTIVE VEHICLE

[75] Inventor: Takashi Ishida, Yokohama, Japan

[73] Assignee: Nissan Motor Company, Limited, Yokohama, Japan

[21] Appl. No.: 56,617

[22] Filed: Jul. 11, 1979

[30] Foreign Application Priority Data

Sep. 20, 1978 [JP] Japan .................................. 53-127933

[51] Int. Cl.³ ............................................. B60K 13/04
[52] U.S. Cl. .................................... 180/296; 181/265; 181/272
[58] Field of Search ................ 180/296; 181/251, 265, 181/266, 272

[56] References Cited

U.S. PATENT DOCUMENTS

| | | | |
|---|---|---|---|
| 598,845 | 2/1898 | Bird | 181/265 |
| 2,096,260 | 10/1937 | Pavillon | 181/265 |
| 2,806,548 | 9/1957 | Carroll | 181/265 X |
| 3,511,617 | 5/1970 | Lyben | 181/251 X |

Primary Examiner—Robert R. Song
Assistant Examiner—Michael Mar

[57] ABSTRACT

An exhaust system of an automotive vehicle, comprises a muffler having a front end face to which an exhaust pipe is connected, and a tail pipe connected at its one end to the front end face of the muffler, the other end of the tail pipe being opened rearward of a rear end face of the muffler, so that the tail pipe is rendered considerably long to effectively silencing exhaust noise even in a small-sized passenger car having a narrow rear overhang.

7 Claims, 5 Drawing Figures

EXHAUST SYSTEM OF AUTOMOTIVE VEHICLE

This invention relates to an improvement of an exhaust system of an automotive vehicle, and more particularly to the arrangement of a tail pipe relative to a muffler located adjacent the rear end of the vehicle body of a small-sized passenger car or automotive vehicle.

It is the principle object of the present invention to provide an improved exhaust system for an automotive vehicle, which is excellent in silencing effect on exhaust noise, overcoming various problems encountered in conventional exhaust systems.

It is another object of the present invention to provide an improved exhaust system for an automotive vehicle, in which low frequency component of exhaust noise is effectively attenuated by a relatively long tail pipe of a muffler, without any disadvantages.

It is a still another object of the present invention to provide an improved exhaust system of an automotive vehicle, by which a sufficient length of a tail pipe of a muffler can be obtained even in a small-sized passenger car having a narrow rear overhang of a vehicle body.

It is a further object of the present invention to provide an improved exhaust system for an automotive vehicle, by which the sufficient volumes of a fuel tank and a spare tire housing can be obtained without being affected by a relatively long tail pipe of a muffler disposed adjacent the fuel tank and the spare tire housing.

It is still further object of the present invention to provide an improved exhaust system for an automotive vehicle, in which a fuel tank located adjacent a muffler is not affected by the high temperature of the exhaust system.

These and other objects, features and advantages of the exhaust system according to the present invention will become more apparent from the following description when taken in conjunction with the accompanying drawings, in which.

Figure 1:
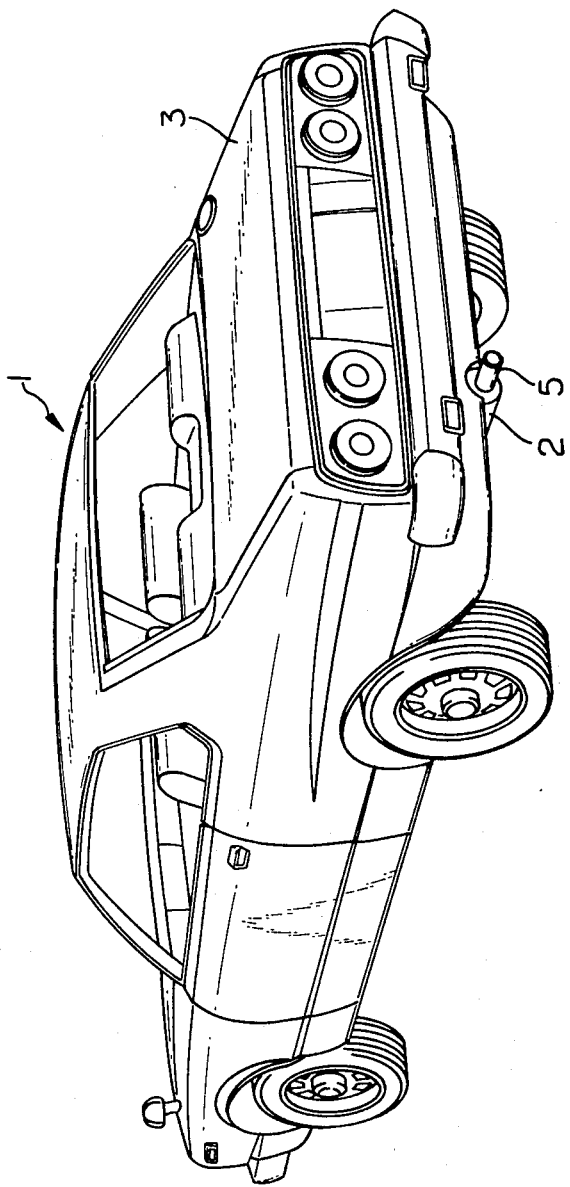
FIG. 1 is a perspective view of a small-sized passenger car with a conventional exhaust system.
Figure 2:
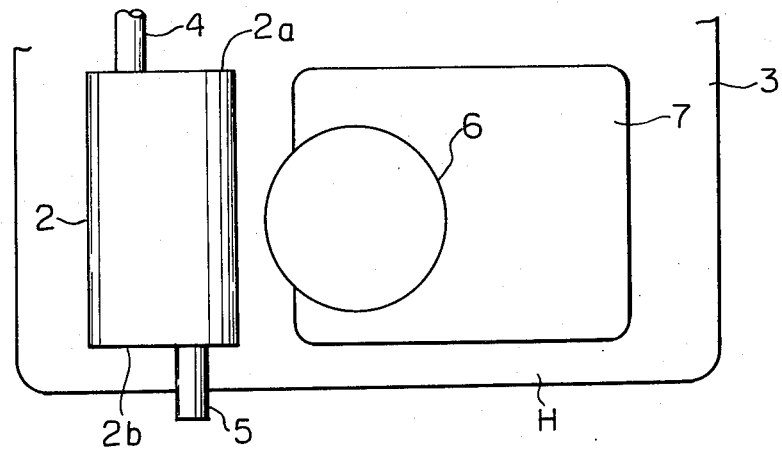
FIG. 2 is a schematic representation showing an example of the layout of the conventional exhaust system.

In conventional small-sized passenger car 1 or automotive vehicle, as shown in FIGS. 1 and 2, a muffler 2 is mounted beneath the floor panel of a trunk 3, and an exhaust pipe 4 and a tail pipe 5 are connected to the front and rear end faces 2a and 2b of the muffler 2, respectively. The exhaust pipe 4 extends from an auxiliary muffler or a catalytic converter (not shown) which is disposed beneath the floor panel on which front seats are located. Also, in the small-sized car, the tail pipe 5 becomes very short, as shown in FIG. 2, because usually a spare tire space or housing 6 and a fuel tank 7 are located under the floor panel of the trunk 3 in conformance with vehicle body construction.

Therefore, in the case of such a short tail pipe, the demerit of poor noise silencing efficiency is encountered in low and medium engine speed ranges in which low frequency exhaust noise is predominant, because the diminishing effect to the low frequency noise is very poor in such a short tail pipe.

Figure 3:
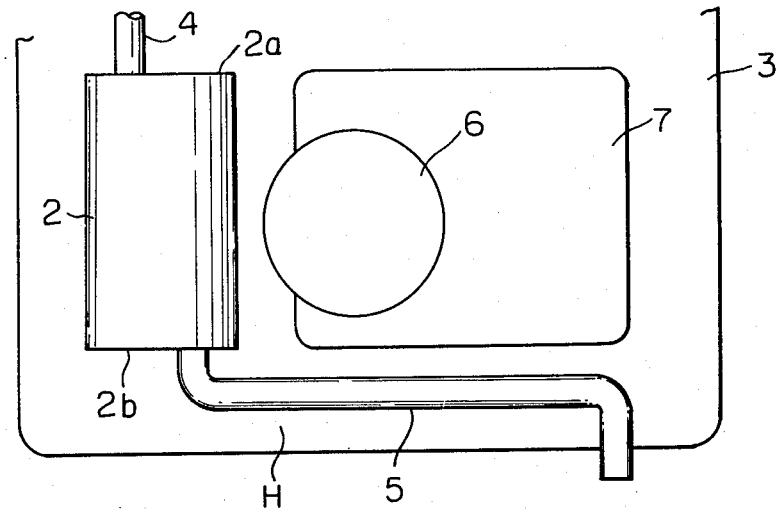
FIG. 3 is a schematic representation similar to FIG. 2, but showing another example of the layout of the conventional exhaust system.

For the above reasons, it has been proposed that the tail pipe 5 is extended, as shown in FIG. 3, to the opposite side to the muffler 2 along a rear overhang H of the vehicle body to increase the silencing effect to the low frequency noise, but such a proposition is not practical for small-sized cars which, because such small-sized cars have the narrow rear overhang and the volume of the spare tire space 6 or the fuel tank 7 is sacrificed or limited by the extended tail pipe 5. Moreover, the tail pipe 5 is extended to the opposite side of the muffler, as mentioned above, which is unsuitable for the adjacent fuel tank 7. Because, the fuel tank 7 is surrounded by the high temperature exhaust system, resulting the rise in fuel temperature in the fuel tank 7.

Figure 4:
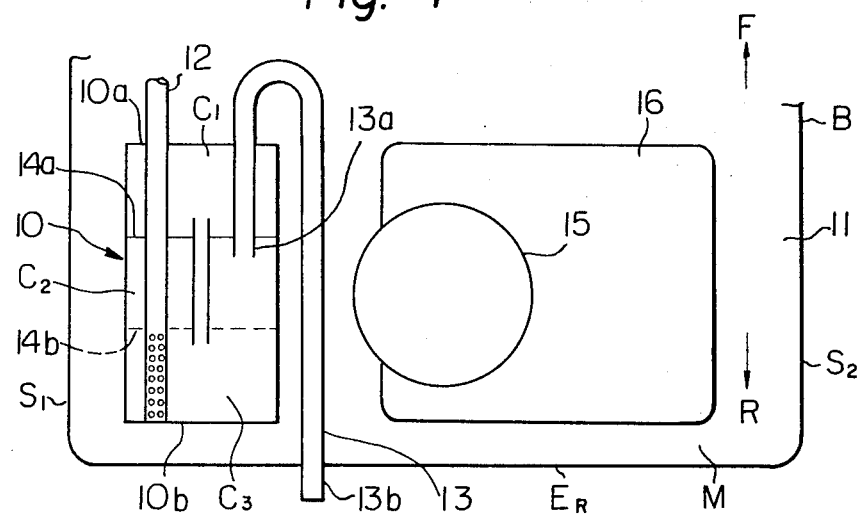
FIG. 4 is a schematic representation showing an example of the layout of an exhaust system in accordance with the present invention.

Referring now to FIG. 4, there is shown a preferred embodiment of an exhaust system (no numeral) in accordance with the present invention, which is, in this instance, of a passenger car or automotive vehicle though not shown. The exhaust system is composed of a muffler 10 for attenuating exhaust noise transmitted from an internal combustion engine (not shown). The muffler 10 is securely disposed beneath the floor panel (not identified) on which a trunk room 11 is defined. The muffler 10 is arranged such that the longitudinal axis (not shown) thereof is parallel with the longitudinal axis (not shown) of a vehicle body B. As shown, the muffler 10 is located adjacent a side $S_1$ and the rear end $E_R$ of the vehicle body B.

An exhaust pipe 12 extending from an auxiliary muffler or a catalytic converter (not shown) is connected to the muffler 10 in such a manner that the pipe 12 is inserted into the muffler 10 though a front end face 10a which faces toward the front F of the vehicle body. It will be understood that the exhaust gases from the auxiliary muffler or the catalytic converter is introduced through the exhaust pipe 12 into the muffler 10. An end portion 13a of a tail pipe 13 is inserted into the muffler 10 through the front end face 10a. The other end portion 13b extends rearward of a rear end face 10b of the muffler 10 which end face 10b faces toward the rear end $E_R$ of the vehicle body B. Additionally, an exhaust gas outlet (no numeral) formed at the tip of the end portion 13b opens to the atmosphere to discharge the exhaust gases admitted into the muffler 10 into the atmosphere. The exhaust gas outlet is located rearward of the vehicle body rear end $E_R$ beyond a rear overhang M of the vehicle body. It is to be noted that a portion of the tail pipe 13 between the both end portions 13a and 13b lies outside of the muffler 10 and parallel with the longitudinal axis of the muffler 10.

The muffler 10, in this instance, is provided thereinside with two partition walls 14a and 14b which separate the interior of the muffler 10 into two expansion chambers $C_2$ and $C_3$ and a resonance chamber $C_3$. An end of the exhaust pipe 12 is opened to the resonance chamber $C_3$, and the tip of the end portion 13a of the tail pipe 13 opens to the expansion chamber $C_2$. It will be understood that the principle of the present invention is applicable to other types of mufflers.

The reference numerals 15 and 16 represent a spare tire housing and a fuel (gasoline) tank, respectively, which are securely disposed beneath the floor panel on which the trunk 11 is formed. The fuel tank 16 is located adjacent a side $S_2$ and the rear end $E_R$ of the vehicle body B. As shown, the portion of the tail pipe 13 between the end portions 13a and 13b lies between the muffler 10 and the fuel tank 16.

With the thus arranged exhaust system, a considerably long tail pipe 13 can be obtained to improve noise silencing effect without sacrificing or reducing spaces for the trunk 11, the fuel tank 16 and the spare tire housing 15, because the tail pipe 13 is connected at its one end portion to the front end face 10a of the muffler 10, and extended along the outside face of muffler 10 to be opened rearward of the rear end face 13b of the muffler 10.

Moreover, since the tail pipe 13 is piping only along the outside face of the muffler 10, the fuel tank 16 is not affected by the exhaust heat from the exhaust system, as compared with of the conventional type in which a fuel tank is surrounded by an exhaust system as shown in FIG. 3. Besides, the tail pipe 13 can be sufficiently extended even in small-sized passenger cars having narrow rear overhangs, improving the exhaust noise silencing efficiency without any particular difficulties.

Figure 5:
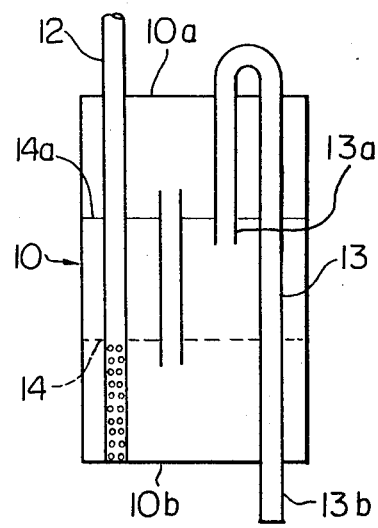
FIG. 5 is a schematic representation showing another example of the layout of the exhaust system in accordance with the present invention.

FIG. 5 illustrates another example of the muffler 10 which is similar to the example shown in FIG. 4 and accordingly the like reference numerals are assigned to the like parts. In this instance, the tail pipe 13 is such arranged that the major part of its portion between the both end portions 13a and 13b lies within the muffler 10. The end portion 13b extends rearward of the rear end face 10b of the muffler 10. This arrangement greatly contributes to render the exhaust system compact and simplify the appearance of the exhaust system.

As appreciated from the foregoing discussion, according to the present invention, both the exhaust pipe and tail pipe are connected to the front end face of the muffler, and the tail pipe is piped inside or along the outside surface of the muffler, and therefore the long tail pipe can be obtained to improve the silencing efficiency to exhaust noise, particularly that in low frequency range, even in small-sized passenger car with a relatively narrow rear overhang, without reducing the volumes of the trunk, the fuel tank, the spare tire housing etc. and without thermally affecting the fuel tank.

What is claimed is:

1. An automotive vehicle having a vehicle body, comprising:
    a muffler disposed beneath the vehicle body to attenuate exhaust noise, said muffler being formed with a front end face facing toward the front of the vehicle and a rear end face facing toward the rear of the vehicle, the longitudinal axis of said muffler being parallel with the longitudinal axis of the vehicle body, said muffler having therein first and second partition walls, said first partition wall being located nearer to the front end face than the second partition wall, a front resonance chamber being defined by the first partition wall, an expansion chamber being defined between the first and second partition walls, a rear expansion chamber being defined by the second partition wall said second partition wall being provided with passage means interconnecting said expansion chambers, and conduit means for connecting said front resonance chamber to said rear expansion chamber;
    an exhaust pipe for introducing therethrough exhaust gases into said muffler, inserted into said muffler through the front end face of said muffler, an end portion of said exhaust pipe opening to the rear chamber of said muffler;
    a tail pipe for discharging therethrough the exhaust gases out of said muffler, having a first end portion inserted through the front end face into said muffler and opening to the expansion chamber of said muffler, a curved portion integrally connected with the first end portion through a first straight portion which is located within the front chamber and parallel with the longitudinal axis of said muffler, and a second end portion located rearward of the rear end face of said muffler, the second end portion being integrally connected with the curved portion through a second straight portion parallel with the first straight portion, the second end portion being formed with an exhaust gas outlet through which the exhaust gases are discharged into the atmosphere.

2. An exhaust system as claimed in claim 1, in which said tail pipe is so disposed that its portion between the first and second end portions lies outside of said muffler.

3. An exhaust system as claimed in claim 1, in which said tail pipe is so disposed that the major part of a portion between the first and second end portions lies within said muffler.

4. An automotive vehicle as claimed in claim 1, in which said muffler is disposed adjacent the rear end of the vehicle, the exhaust gas outlet being extended beyond the rear overhang of the vehicle body.

5. An automotive vehicle as claimed in claim 4, further comprising a fuel tank disposed beneath the vehicle body and adjacent said muffler.

6. An automotive vehicle as claimed in claim 5, in which said tail pipe is so located that said portion between the first and second end portions lies between said muffler and said fuel tank.

7. An automotive vehicle as claimed in claim 5, in which said tail pipe is so located that said major part of said portion between the first and second end portions lies within said muffler.

* * * * *